United States Patent
Ratti et al.

(10) Patent No.: US 8,064,684 B2
(45) Date of Patent: Nov. 22, 2011

(54) METHODS AND APPARATUS FOR VISUALIZING VOLUMETRIC DATA USING DEFORMABLE PHYSICAL OBJECT

(75) Inventors: Carlo Filippo Ratti, Turin (IT); Benjamin Tarquinn Fielding Piper, London (GB); Yao Wang, Cambridge, MA (US); Hiroshii Ishii, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1399 days.

(21) Appl. No.: 10/696,474

(22) Filed: Oct. 29, 2003

(65) Prior Publication Data

US 2004/0207652 A1    Oct. 21, 2004

Related U.S. Application Data

(60) Provisional application No. 60/463,273, filed on Apr. 16, 2003, provisional application No. 60/463,357, filed on Apr. 17, 2003.

(51) Int. Cl.
*G06K 9/00* (2006.01)
*G06K 9/46* (2006.01)
*G06T 15/00* (2011.01)
*G06T 17/00* (2006.01)
*G01B 11/16* (2006.01)

(52) U.S. Cl. ........ 382/154; 382/203; 345/419; 345/420; 353/28; 356/602; 356/603; 356/604; 356/605; 356/606; 356/607; 356/608

(58) Field of Classification Search ................. 345/419, 345/420; 353/28; 356/601, 602, 603, 604, 356/605, 607, 608, 606; 382/154, 203
See application file for complete search history.

(56) References Cited

U.S. PATENT DOCUMENTS

| | | | | | |
|---|---|---|---|---|---|
| 5,221,937 | A | * | 6/1993 | Machtig | 353/28 |
| 5,687,305 | A | * | 11/1997 | Graham et al. | 345/632 |
| 5,892,352 | A | * | 4/1999 | Kolar et al. | 323/213 |
| 5,982,352 | A | * | 11/1999 | Pryor | 345/156 |
| 6,259,815 | B1 | * | 7/2001 | Anderson et al. | 382/218 |
| 6,341,869 | B1 | * | 1/2002 | Inami et al. | 353/28 |
| 6,554,431 | B1 | * | 4/2003 | Binsted et al. | 353/28 |
| 6,611,617 | B1 | * | 8/2003 | Crampton | 382/154 |
| 6,765,566 | B1 | * | 7/2004 | Tsao | 345/419 |
| 7,181,362 | B2 | * | 2/2007 | Ratti et al. | 702/152 |
| 7,181,363 | B2 | * | 2/2007 | Ratti et al. | 702/159 |

OTHER PUBLICATIONS

Piper, et al. "Illuminating Clay: A 3-D Tangible Interface for Landscape Analysis." Proceedings of CHI 2002. (2002): 1-8. Print.* Ben-Joseph, Eran. "Tangible Infoscapes." Landscape Architecture. (2002): 54-59. Print.*
Piper, et al. "Illuminating Clay (Internet Archive Version)." Tangible media group projects. MIT, Aug. 8, 2001. Web. Aug. 16, 2011. <http://web.archive.org/web/20010828213141/http://tangible.media.mit.edu/projects/IlluminatingClay/IlluminatingClay.htm>.*
Ben-Joseph, et al. "Urban Simulation and the Luminous Planning Table: Bridging the Gap between the Digital and the Tangible." Journal of Planning Education and Research. 21. (2001): 196-203. Print.*

* cited by examiner

*Primary Examiner* — Matthew Bella
*Assistant Examiner* — Michael A Newman
(74) *Attorney, Agent, or Firm* — Stephen Otis

(57) ABSTRACT

An interface that allows a user to explore complex three dimensional datasets. The user manipulates a physical modeling material that defines the geometry of a surface that intersects a voxel dataset and the intersected voxel values are projected back onto the surface of the physical material as image data. A position sensor captures position data specifying the geometry of the surface, a processor compares the array of data values with the captured position data to identify selected ones of these data values whose position in the array corresponds to the geometry of the surface, and a projector for illuminates the surface with an image representative of the data at the array/surface intersection.

20 Claims, 2 Drawing Sheets

METHODS AND APPARATUS FOR VISUALIZING VOLUMETRIC DATA USING DEFORMABLE PHYSICAL OBJECT

CROSS REFERENCE TO RELATED APPLICATIONS

This application claims the benefit of the filing date of the copending U.S. Provisional Patent Applications Ser. No. 60/463,273 entitled "Three dimensional tangible interface for interacting with spatial-temporal data using a laser scanner" filed on Apr. 16, 2003 and Ser. No. 60/463,357 entitled "Three dimensional tangible interface for interacting with spatial-temporal data using infrared light sources and infrared detectors" filed on Apr. 17, 2003, the disclosures of which are hereby incorporated herein by reference.

FIELD OF THE INVENTION

This invention relates to systems for visualizing three dimensional datasets.

SUMMARY OF THE INVENTION

In its preferred form, the present invention enables a user to intuitively explore and visualize complex three dimensional datasets by manipulating the position and shape of a physical modeling surface.

By alerting the shape of the physical material, the user selects the geometry of a free form surface that is used as a cutting surface to intersect a voxel dataset. The intersected voxel values are then converted to image data that is projected back onto the surface of the physical material. The system consists of a manually manipulatable physical model that defines a surface whose shape or position may be altered, a position sensor for generating position data specifying the geometry of the surface, a processor for comparing the voxel dataset with the sensed position data to identify those voxel values which have positions in the array that correspond to the geometry of the surface, and a projector for illuminating the surface with an image representative of the voxel data at the intersection of the array and the defined surface geometry.

The physical object used to model the surface geometry is constructed of a material which forms a surface whose shape and position varies when said object is manually manipulated and upon which an image may be projected and viewed by a user. The material may comprise a deformable material, such as clay or plastic, which defines a manipulatable curvilinear surface whose three dimensional geometry is captured by a laser scanner or the like. Alternatively, the material may consist of an aggregation of smaller movable objects, such as beads or rectilinear blocks, which may be individually moved to alter the shape or position of the surface. The material may be translucent and the geometry of the surface may be detected by a camera which captures the intensity of the light passing through the material to the surface such that the surface light intensity varies in relation to the depth of material.

The data evaluation methods and apparatus contemplated by the invention provide the benefits of both physical and digital data representations. The interface shares many of the advantages of a standard graphical user interface (GUI) by allowing colored, layered, annotated and/or dynamic information to be represented to the user. As with GUI interfaces, different layers of information such as tissue types, solid objects or annotations can be invoked at will, offering a level of interactivity that is not possible using non-augmented three dimensional models. However, unlike GUI methods which present three dimensional data in two dimensional cross-sections or, at best, perspective renderings, the present invention presents three dimensional data in three dimensional space, allowing users to gain an intuitive understanding of complex relationships through the natural mechanisms of human spatial understanding (bioptical vision, position parallax and the tactile senses). These benefits are provided with a relatively simple and inexpensive hardware, without the need of tethering technologies such as tags, position-tracking devices, gloves or headgear as commonly used in virtual reality or artificial reality environments.

The interface allows users to take advantage of the natural dexterity of their hands to quickly define cutting surface geometries of arbitrary complexity. These same geometries might take hours to define with the same level of control using traditional GUI methods. The interactive components of the system allow users to explore spatial relationships through the manipulation of a physical material. As with conventional physical models, this approach gives a tangible immediacy to three dimensional data representations with the additional benefit of a 1:1 mapping of scale where appropriate. However, unlike conventional physical models, which are normally rigid and offer limited scope for interaction, the invention allows users to cut a section at any desired location in a voxel dataset and to visualize the corresponding values in the array of volumetric data.

These and other features and advantages of the present invention may be more clearly understood by considering the following detailed description of specific embodiments of the invention. In the course of this description, frequent reference will be made to the attached drawings.

DETAILED DESCRIPTION

Figure 1:
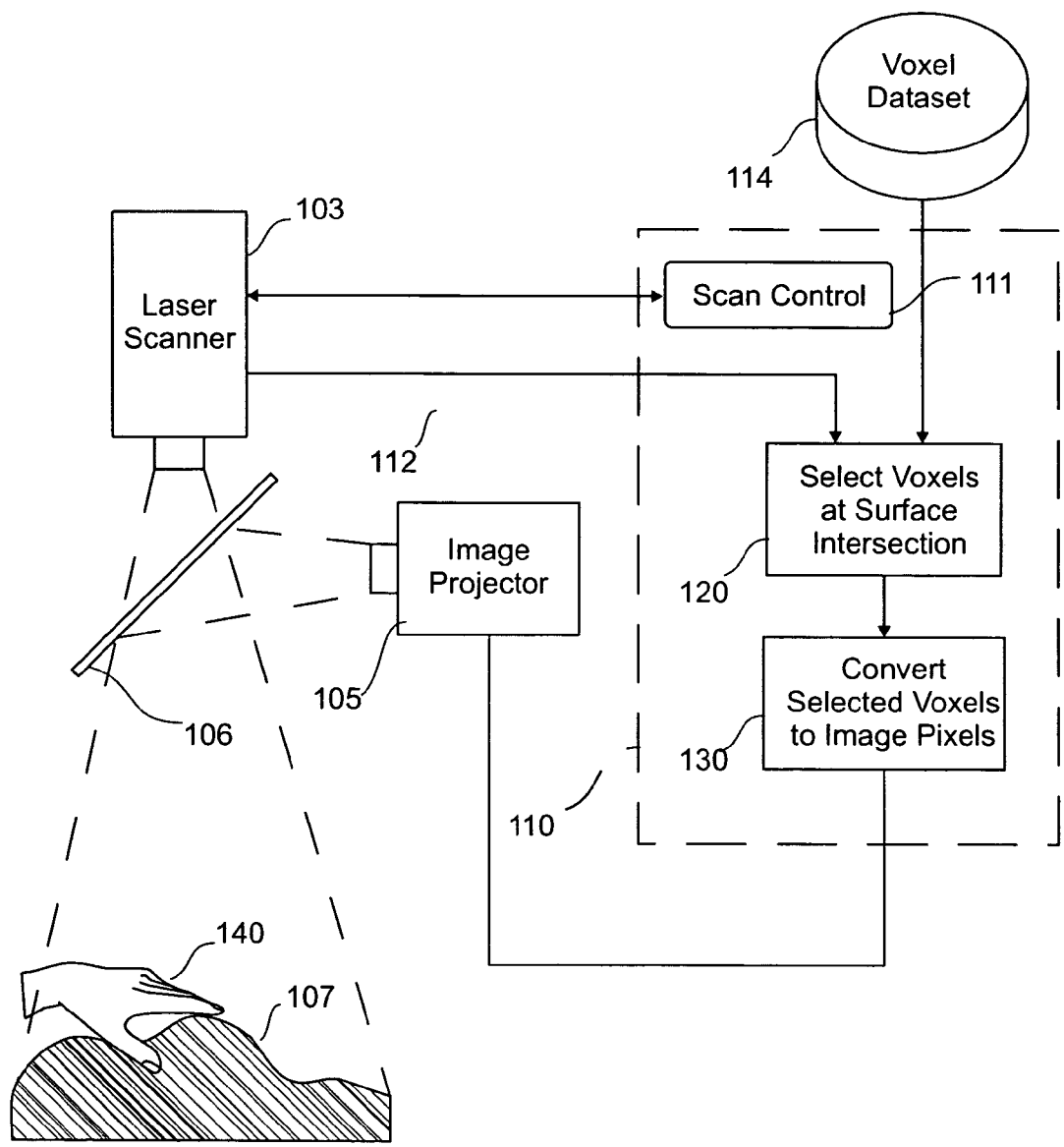
FIG. 1 is a block diagram illustrating a first embodiment of the invention employing a laser scanner to detect the geometric shape and position of a surface defined by a deformable modeling material.

The system contemplated by the present invention is called a "phoxel space interface" and permits a user to physically interact with voxel data represented as "phoxels" (physical volumetric pixels). As used herein, a "voxel" (volumetric pixel) is the smallest discrete spatial component of a digital "volume" that provides a three dimensional representation of information. A "phoxel" is a voxel that is represented visually on a physical surface in three dimensional space. The system contemplated by the invention uses the surface geometry of a physical material to define a cross section surface that passes through the volume described by the voxel dataset. The values in the dataset that are intersected by this surface geometry are converted to visual images that are projected back onto the surface of the physical material. The system enables users to easily define the location and geometry of a desired cross section through the voxel dataset and to interactively view the results. The system includes the following components:

(a) Physical modeling material. This material is used to define the geometry of a surface which intersects the dataset. As described in more detail below, different kinds of materials (such as clay, plasticine, glass beads, cubic blocks, etc.)

can be used and the particular material is chosen depending on the type of voxel data to be explored and the manner in which the position of the intersecting surface geometry is measured. The material chosen must also provide a suitable surface upon which an image representing the phoxel data can be projected. Plastic materials such as clay or plasticine that are easily shaped and, after being shaped, retain their shape, may be used to define a surface whose position is determined by a laser scanner. The physical modeling material may also consist of a glass beads which are individually movable, like the grains of sand in a sandbox, to define a surface whose geometry may be determined by optical measurements. Individually movable rectilinear blocks may be stacked to define a surface whose position may be determined using a laser scanner or optical measurement.

(b) A voxel dataset. This dataset is the source of information to be explored using the phoxel-space interface. The voxel dataset comprises an array of point values organized in a regular 3-dimensional grid. Voxel datasets may be generated using sensing technologies such as NMR (nuclear magnetic resonance) or CTI (computerized thermal imaging), or by computational simulations such a CFD (computational fluid dynamic) simulations. Note that the voxel dataset may be dynamically varying, resulting in a time varying image being projected onto the physical model surface that reflects time- varying changes at the surface/voxel volume intersection.

(c) A three-dimensional sensor. A thee dimensional sensor is required in order to capture the surface geometry of the physical modeling material. This sensor is preferably capable of capturing changes in the surface geometry in real-time, thereby allowing interactive exploration of the given voxel dataset by the user. The type of sensor selected may be dependent on the kinds of modeling material used as explained below.

(d) A data processor. A conventional computer may be used to store the voxel dataset, control the three-dimensional sensor to produce data indicating the current position of the physical surface, process the three-dimensional sensor output and identify the subset of voxel values that are intersected by the physical surface geometry.

(e) An image projector. The image projector, which may take the form of a conventional LCD, CRT or DLP video projector of the type used to display computer generated graphical data, is employed to project RGB (or gray-scale) pixel data representative of the voxel values rendered by the processor back onto the surface of the physical modeling material. The video projector is calibrated with the three-dimensional sensor to allow projected voxel values to correspond with points on intersection on the surface geometry. The type of projector used is partially dependent on the 3-dimensional sensing technique as described below.

Two illustrative implementations of the invention are presented in the description that follows. The first embodiment, seen in FIG. 1, employs a deformable plastic material to define the three dimensional surface and includes a laser scanner to determine the position of the surface. The second embodiment, illustrated in FIG. 2, uses a bed of translucent beads to create a physical three dimensional surface which can be formed by the user and a camera to measure the intensity of light transmitted upwardly through the beads to determine the depth of the beads to capture the geometry of the surface. The laser scanner embodiment of FIG. 1 is highly reliable and accurate, but more expensive to construct than the camera embodiment of FIG. 2.

The arrangement shown in FIG. 1 uses a commercially available triangulation based laser scanner 103 such as the Minolta Vivid-900 available from the Instrument Systems Division of MINOLTA USA, 101 Williams Drive, Ramsey, N.J. to capture the surface geometry of the physical modeling material. The laser scanner is calibrated with a video projector 105 which is positioned with the laser scanner 103 above the physical modeling material seen at 107. In the configuration shown in FIG. 1, the laser scanner 103 and the image projector 105 would be located at the same optical origin to avoid problems of shadowing, occlusion and image distortion. This is achieved using a coated mirror 106 transparent to the laser scanner and reflective of the visible spectrum, as explained in U.S. Provisional Patent Application Ser. No. 60/463,273 filed Apr. 16, 2003. However, tests have shown that, from a distance of 2 meters and with an operating volume of approximately 0.5×0.5×0.5 m, the maximum extent of the phoxel space occupied by the surface of the modeling material 107, a simpler arrangement where the projector and scanner are positioned along side each other performs adequately since the scanned and projected rays can be considered to originate from the same source.

The laser scanner 103 determines the geometric position of the surface of the modeling material 107 with a high degree of accuracy and allows any opaque non-reflective material to be used as a modeling medium. Laser scanners are costly, however, and less accurate alternatives may be employed, one of which is described below in connection with FIG. 2.

The scanner 103 and the image projector 105 should be calibrated to ensure that the spatial coordinates of the surface of the material captured by the scanner correspond precisely with correct voxel values represented by the image pixels projected onto the surface. The scanner/projector pair may both be housed inside a casing (not shown) at a height of approximately 2 meters above the surface of the modeling material 107.

The Minolta Vivid 900 used to implement the scanner 103 was designed to perform single scans of static objects and scenes. In order to capture changes in the surface geometry of the modeling material in real-time, it is controlled by the connected processor to repeatedly scan the surface of the material. A scan control routine indicated at 111 in FIG. 1 is executed by the same processor, shown generally at 110, which also uses the position data from the scanner delivered at 112 to select the voxel values in the voxel dataset 114 which may be persistently stored in a hard drive or the like connected to the processor 110. This is allows 320×240 point values to be captured every 0.3 seconds, resulting in a near-real-time capture of the geometry of the upper surface of the modeling material 107. This scanned data output at 112 is processed to form data defining the x, y and z coordinates of the modeling material's surface. As illustrated at 120, this surface geometry data is used to identify the those voxel values in a voxel dataset 114 which are positioned at the intersection of the voxel volume and the surface geometry established by the position of the surface of the modeling material 107.

As illustrated at 130, the voxel values selected at 120 are then assigned RGB values that define the color of each corresponding spot of light projected by the image projector 105 onto the three dimensional surface of the modeling material 107. A resulting graphical "phoxel" visualization of the voxel dataset values at the surface intersection is accordingly displayed to the user who can interactively change the geometry of the surface intersection, and the representation of voxel dataset at the surface intersection, by manually deforming the modeling material as illustrated at 140.

The voxel data values being depicted by the displayed image on the surface will represent different things in different applications. In medical applications, each voxel value may represent the NMR (nuclear magnetic resonance) signal intensity of the contents of the corresponding volume element of tissue being analyzed, or may represent the amount of heat being given off by a volume element of tissue as measured by a computerized thermal imaging (CTI) system. In the aerospace and automotive industries, computational fluid dynamic (CFD) simulations may be used to produce voxel datasets that describe the air flow around planes and cars.

Once a voxel dataset has been produced by a sensing or scanning device, or computer-generated by a simulation process, or some other means, the resulting original voxel data may be pre-processed in a variety of known ways. The pre-processing of a voxel dataset may create a modified voxel dataset in order to achieve a variety of objectives, including: (1) defect correction, such as noise removal; (2) image enhancement, such as data rescaling or highlighting features of interest; (3) segmentation, such as identifying a range of voxel values that separate the features of interest from the background; and/or (4) binary image manipulation, such as employing a filter to calculate a replacement value for each voxel in the dataset from a combination of its original value and the values of the neighboring voxels, or morphology processing to change the shape of bodies. Image data processing is described, for example, in The Image Processing Handbook, by John C. Russ, CRC Press (ISBN 0-8493-2516-1).

Figure 2:
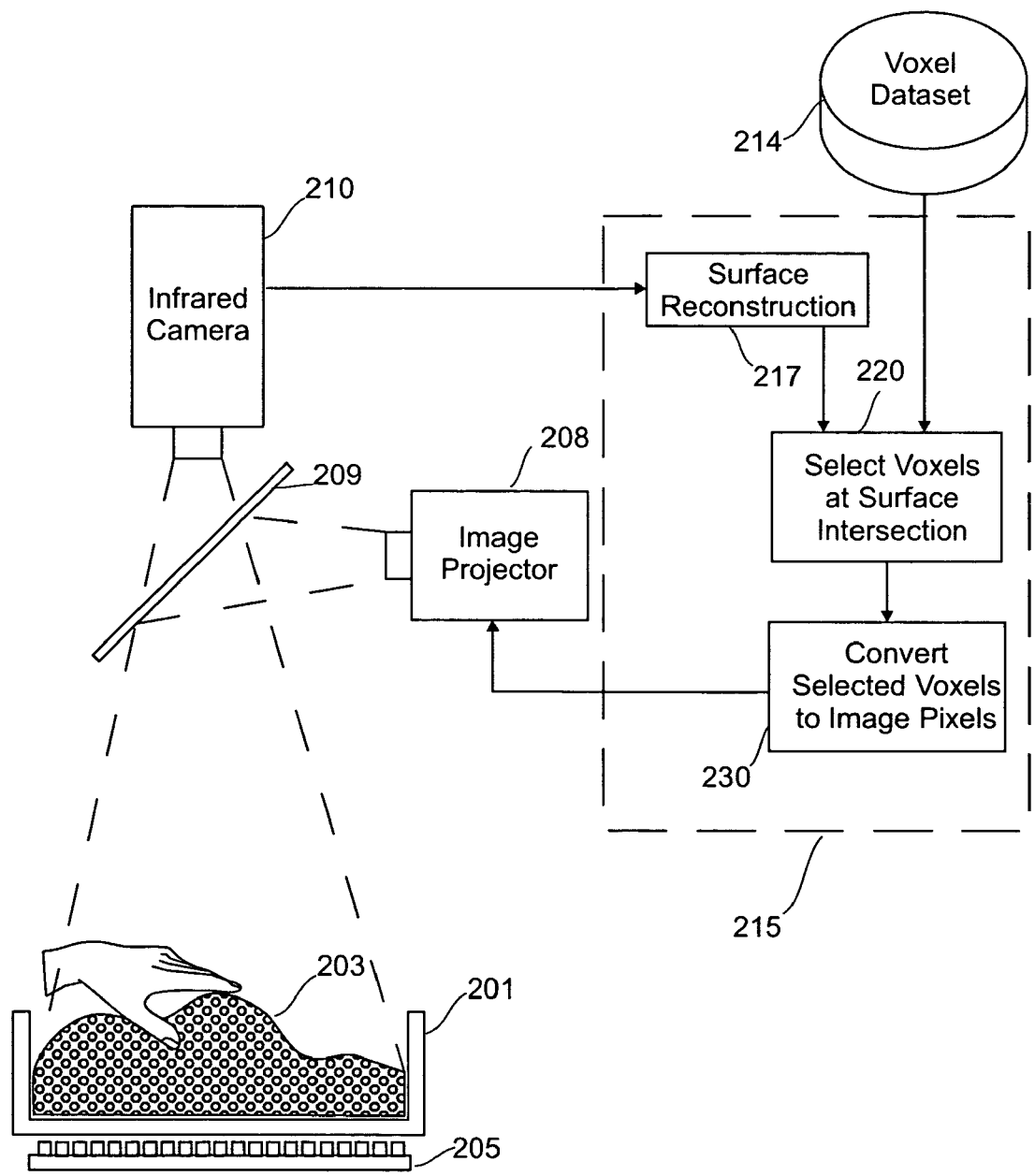
FIG. 2 is a block diagram of a second embodiment of the invention employing an infrared camera to capture the geometry of a surface formed by a bed of glass beads illuminated from below by an array of LEDs.

The second embodiment of the invention shown in FIG. 2 substitutes an infrared light transmission mechanism to determine the position of a manually manipulatable modeling surface formed be a bed of glass beads. A box 201 containing a volume of 1 mm diameter glass beads at 203 is lit from beneath with an array of 600 high power infrared LEDs as seen at 205. Four IR mirrors (not shown) are placed on the interior side walls of the box 201 surrounding the LED array to create an infinite plane of uniform radiance. A video projector 208 transmits via the reflective glass 209 to the surface of the glass beads at 203. A monochrome infrared camera 210 is mounted 2 meters above the surface of the beads 203 and captures the intensity of light passing through the volume. A voxel dataset 214 is stored in a memory device connected to a processor 215 which reconstructs the geometry of the surface of the beads 203 from the image of the surface captured by the camera 210 as indicated at 217. The intensity of transmitted light at the surface captured by the camera 210 is proportional to the depth of the beads and a lookup table can be used to convert surface radiance values into the surface elevation values. The processor 215 then compares the geometry data with the voxel dataset 214 as indicated at 220, and also converts the voxel data selected at 220 into pixel image values which are delivered to the projector 208.

The system is calibrated to work with a specific bead size and the optical properties of the material used (absorption and scattering coefficients) are critical to its successful functioning. Due to the exponential decay of the IR light passing through the glass beads (or any other material) the intensity at the top surface can vary greatly and exceed the optical intensity range of the video camera. The solution is to take several images of differing exposure time and combine these to recover the effective radiance of the scene, as explained in Recovering High Dynamic Range Radiance Maps from Photographs, Debevec and Malik, SIGGRAPH 1997.

The surface geometry measurement scheme of FIG. 2 is less accurate than the use of the laser scanner as depicted in FIG. 1. In addition, this approach is material-dependent, requiring the use of beads, blocks or the like with predictable light transmission characteristics, and time-consuming testing and calibration. However, the system has the advantage of high speed, potentially capturing surface geometries at six frames per second, and low cost—an order of magnitude less expensive than the laser scanner. The infrared technique of FIG. 2 provides sufficient accuracy for a number of useful applications.

In both configurations, a calibration parameter defining the ratio between the scale of the voxel dataset and the scale of the physical modeling surface providing the phoxel-space needs to be defined. The system can work at a 1:1 scale so that, for example, a physician exploring MRI scanning data for the human body can manipulate and visualize three dimensional representations of anatomy in their actual size. In the same way, the system may be used in geophysical applications as described below where the scale is 1:5,000,000. The computational operations are the same in both configurations: the intersection between the surface of the modeling material and the voxel data is calculated and used to determine an image that is projected back onto the three dimensional surface of the modeling material.

In both configurations interference with the scanning and projection process may result when the user's hands are placed within the scene to manipulate the geometry of the modeling material. This problem could be partially eliminated by applying a removal algorithm with image-processing techniques or a simple toggle switch. However, in many applications, it is preferable to scan the position of the hands and project the hand/voxel intersection data onto the user's hands to provide an additional method for exploring voxel datasets. Users can tentatively position their hands in phoxel space and use their hands to provide a surface for intersection and projection. Once a region of interest is discovered in this way, the modeling material can be used to build up a more permanent surface.

A range of modeling materials can be used to provide an intersection and projection surface in phoxel space. Each material has different characteristics and some are more appropriate than others for different kinds of data exploration. For example, discrete element models consisting of pre-formed nesting sections are useful for demonstrating pre-defined regions, such as in the teaching of brain anatomy, while a deformable material such as plasticine is useful as means to discover the precise shape and location of unsegmented regions, such as the tumor. Modular blocks such as sugar cubes can be useful in representing predefined volumes, as in the geophysics example described below, and the glass beads are suited to the gradient geometries found in examples like the CFD simulation. These materials can be broadly classified by their relative grain size. While the larger grain sizes are more suited to predefined, object oriented modeling, smaller grain sizes as found in the glass beads and plasticine offer precise control over form and so are better suited to the understanding of unknown, undefined geometries.

The representation of complex boundaries, such as those found between differing tissues, seismic velocity zones, archaeological elements, and equal fluid pressure surfaces, are difficult to comprehend using conventional methods. Phoxel space allows this kind of analysis to be an easy and intuitive task. In addition, the physicality of the interface also allows multiple users to collaborate around the same model, providing a platform for discussion and shared understanding.

The phoxel space interface has been shown to be useful in a number of different applications. Three such applications are described below using the laser scanner embodiment of FIG. 1, and a fourth employing the infrared camera with a bed of glass beads seen in FIG. 2.

1. Illustrating brain regions using discrete element model. Students are conventionally taught about the complex structure of human anatomy through the use of diagrams, photographs, models, 3d visualizations, video clips and cadaver vivisections. Each form of representation is valuable in a different way. A diagram may clearly depict generalizable properties of the brain but may lack the particularity of a photographic image that can record a specific condition. Physical models may convey spatial relationships but lack flexibility. Volume renderings may allow examination of particular case data, but they rely on being understood as two dimensional visual information. Cadaver vivisections allow students to become familiar with the properties of real anatomical tissues and spatial relationships but they do not allow for the demonstration of a particular condition and it is a destructive process of great expense. Phoxel space can be used to represent a regionally segmented model of the human head to be used for teaching and demonstration purposes. A physical model of a specific and perhaps rare condition is produced from an existing MRI, CTI or cross-sectional dataset using a rapid prototyping process. The physical model of the brain is made up of a series of discrete elements that can be removed by teachers or students at will. As elements are removed or added, visual information relating to newly revealed surfaces is projected onto the surface of the model. Unlike conventional, non-augmented models, the phoxel space interface allows a student to switch between MRI, CTI or anatomical surface information, and permits dynamic information, such as time varying brain activity, to be projected onto the model.

2. Analysis of brain tumor using malleable material. A more demanding application uses the phoxel space interface to plan surgical operations in non-regionalized anatomies. While visual renderings and MRI cross sections greatly aid in such surgical planning, the phoxel space interface allows surgeons to non-invasively explore living anatomical regions in thee dimensions. In this example, a malleable material, plasticine, is used to define a freeform cross-section surface onto which anatomical MRI voxel data is projected. The surgeon is then able to alter the form of this cross section surface by manipulating the plasticine material, revealing the precise spatial boundary between, for example, tumor affected regions and normal tissues. This spatial understanding would be extremely difficult to convey in any other medium and could greatly facilitate the planning of surgical operations.

3. Seismic velocities revealed with block modules. As in biomedicine, the field of seismology requires a sophisticated understanding of spatial relationships, in this case within the volume of the earth. A phoxel space interface could be used, for example, to explore the seismic velocity within the Australian plate, recorded using a network of geophones laid out across the continent. The model reaches a depth of 55 km and discrete blocks (sugar cubes) may be used, each representing a 5 km depth and a surface area of 50×50 km. The geoscientist can add or remove these blocks to reveal regions of equal seismic velocity, gaining a clearer understanding of the three dimensional composition of the earth's crust.

4. CFD simulation represented with continuous material. Phoxel space may also be used to gain better understanding of computer-generated datasets, such as those obtained with Computational Fluid Dynamic (CFD) simulations. A physical model airplane is half submerged in the volume of glass beads. The model is calibrated with three dimensional CFD simulation data indicating the air temperature around the airplane geometry. As the glass beads are removed, the varying temperatures around the plane form a scaled color map, and the user can manipulate the bed of beads to build surfaces which represent regional boundaries or equal temperatures.

Conclusion

It is to be understood that the methods and apparatus which have been described above are merely illustrative applications of the principles of the invention. Numerous modifications may be made by those skilled in the art without departing from the true spirit and scope of the invention.

What is claimed is:

1. A method of accepting a selection of a cross-section of a voxel dataset and of projecting visual information representative of data in the cross-section,
the selection being indicated by a human user making an alteration in the shape of a physical object,
the physical object having a position and shape that defines a three dimensional surface, and
the voxel dataset being stored in digital memory and comprising a set of data values in a three-dimensional array,
which method comprises, in combination, the steps of:
employing a first sensor to produce sensor data regarding the physical object after the alteration occurs, and
employing a processor
to process the sensor data to determine the position and shape of the three dimensional surface, and
to identify the cross-section, which cross-section comprises a subset of the data values with positions in the three-dimensional array that correspond to the three dimensional surface, and
projecting onto the three dimensional surface an image representative of the subset of data values that comprise the cross-section.

2. The method of claim 1 wherein said physical object comprises a deformable material that may be shaped to alter the position of said three dimensional surface.

3. The method of claim 1 wherein said first sensor comprises a laser scanner.

4. The method of claim 1 wherein said physical object is formed from a translucent material and wherein said sensor measures the position of said surface by measuring the extent to which light is attenuated when passing through said translucent material to reach said surface.

5. The method of claim 4 wherein said physical object comprises an aggregation of moveable objects.

6. Apparatus for accepting a selection of a cross-section of a voxel dataset and of projecting visual information representative of data in the cross-section,
the selection being indicated by a human user making an alteration in the shape of a physical object,
the voxel dataset being stored in digital memory and comprising a set of data values in a three-dimensional array,
which apparatus comprises in combination,
the physical object, which is manually manipulatable and defines a three-dimensional surface whose shape or position may be altered,
a position sensor for generating position data specifying the current geometry of said surface,
a memory device for storing said voxel dataset,
a processor coupled to said position sensor and to said memory device for comparing said voxel dataset with said position data to identify selected ones of said data values which have positions in said array that correspond to the current geometry of said three-dimensional surface, and
a projector for illuminating said three-dimensional surface of said physical object with an image representative of said selected ones of said data values as the shape or position of said three-dimensional surface is altered during the manual manipulation of said physical object.

7. The apparatus of claim 6 wherein said physical object comprises a deformable material that may be manually manipulated to alter the position of said surface.

8. The apparatus of claim 6 wherein said physical object is constructed of a material which forms a surface whose geometry varies when said object is manually manipulated and upon which an image may be projected and viewed by said human user.

9. The apparatus of claim 8 wherein said physical object comprises a deformable material that may be shaped to alter the shape or position of said three dimensional surface.

10. The apparatus of claim 8 wherein said physical object comprises an aggregation of smaller movable objects which are adapted to be moved to alter the shape or position of said surface to vary said image.

11. The method of claim 1, wherein the cross-section is curved.

12. The method of claim 1, wherein each data value in the voxel dataset is indicative of a value measured by one or more sensors other than the first sensor with respect to a volume element of a volume, which volume does not include the physical object.

13. The method of claim 1, wherein each data value in the voxel dataset represents a value measured with respect to a volume element of tissue.

14. The method of claim 1, wherein the data values in the voxel dataset are not parameters of the physical object or of any deformable template that the processor is adapted to elastically match with the physical object.

15. The method of claim 1, further comprising the step of employing the processor to convert the subset of voxel values to image values.

16. The method of claim 1, wherein the voxel dataset changes over time, causing the image to vary over time.

17. The method of claim 1, wherein the alteration is made by the human user manipulating the physical object.

18. The apparatus of claim 6, wherein the cross-section is curved.

19. The apparatus of claim 6, wherein each data value in the voxel dataset is indicative of a value measured by a sensor other than the position sensor with respect to a volume element of a volume, which volume does not include the physical object.

20. The apparatus of claim 6, wherein the data values in the voxel dataset are not parameters of the physical object or of any deformable template that the processor is adapted to elastically match with the physical object.

* * * * *